United States Patent
Ide (10) Patent No.: US 10,474,260 B2
(45) Date of Patent: Nov. 12, 2019

(54) DISPLAY DEVICE

(71) Applicant: Japan Display Inc., Tokyo (JP)

(72) Inventor: Tatsuya Ide, Tokyo (JP)

(73) Assignee: Japan Display Inc., Tokyo (JP)

( * ) Notice: Subject to any disclaimer, the term of this patent is extended or adjusted under 35 U.S.C. 154(b) by 402 days.

(21) Appl. No.: 15/252,673

(22) Filed: Aug. 31, 2016

(65) Prior Publication Data

US 2017/0147115 A1 May 25, 2017

(30) Foreign Application Priority Data

Nov. 20, 2015 (JP) ................. 2015-227925

(51) Int. Cl.
*G06F 3/041* (2006.01)
*G02F 1/1333* (2006.01)

(52) U.S. Cl.
CPC ........ *G06F 3/0412* (2013.01); *G02F 1/13338* (2013.01); *G06F 2203/04103* (2013.01); *G06F 2203/04106* (2013.01)

(58) Field of Classification Search
CPC ........ G06F 3/0412; G02F 2203/04103; G02F 2203/04106
See application file for complete search history.

(56) References Cited

U.S. PATENT DOCUMENTS 9,090,211 B2 * 7/2015 McCabe ................. B60R 1/088
9,994,772 B2 * 6/2018 Kuriyama .......... C09K 19/3814

2003/0058225 A1 * 3/2003 Kusuda ................... G06F 3/045
345/173
2011/0315297 A1 * 12/2011 Koshio ................. G02F 1/1309
156/64
2014/0232952 A1 * 8/2014 Watanabe ........... G02F 1/13338
349/12

FOREIGN PATENT DOCUMENTS

| CN | 101498808 A | 8/2009 |
| CN | 102298232 A | 12/2011 |
| JP | 2011-70092 A | 4/2011 |

OTHER PUBLICATIONS

"Contact Angles" https://chem.libretexts.org/Core/Physical_and_Theoretical_Chemistry/Physical_Properties_of_Matter/States_of_Matter/Properties_of_Liquids/Contact_Angles.*
Chinese Office Action dated Apr. 10, 2019 for the corresponding Chinese Patent Application No. 201610885660.1, with partial machine transation.

* cited by examiner

*Primary Examiner* — Laura C Powers
(74) *Attorney, Agent, or Firm* — Michael Best & Friedrich LLP (57) ABSTRACT

The display device having a touch panel includes a detection electrode forming a touch panel and arranged on one surface of a display cell, a protective layer covering the detection electrode, and an optical film adhered to the protective layer, wherein a first surface of the protective layer adjacent to the optical film has a smaller water contact angle compared to a second surface of the protective layer adjacent to the display cell. The first surface of the protective layer is preferred to have a half or less the water contact angle compared to the second surface of the protective layer.

5 Claims, 9 Drawing Sheets

FIG. 8 ered within a display cell (Japanese Laid Open Patent Publication No. 2011-70092).
DISPLAY DEVICE

CROSS REFERENCE TO RELATED APPLICATIONS

This application is based upon and claims the benefit of priority from the prior Japanese Patent Application No. 2015-227925 filed on Nov. 20, 2015, the entire contents of which are incorporated herein by reference.

FIELD

The present invention is related to a display device having a touch panel. In particular, the present invention is related to a display device in which a liquid crystal cell and a touch panel are compounded.

BACKGROUND

Conventionally, a liquid crystal display device is known in which a touch panel s arranged on a front surface of a liquid crystal cell. By arranging a touch panel as an input sensor on a GUI (graphical user interface) screen which is displayed on a liquid crystal cell, it is possible to input data using fingers or a pen and the like.

A liquid crystal display device which is attached with a touch panel to a liquid cell increases in thickness and weight by the size of the touch panel. Thus, in recent years, liquid crystal display devices have been proposed in which a touch panel is incorporated within a display cell (Japanese Laid Open Patent Publication No. 2011-70092).

Among display devices which incorporate touch panels within a display cell, there are also types which are arranged with one electrode which forms a touch panel within a display cell and the electrode is arranged on the exterior of the display cell. In this case, since a cutting process of a display cell and process for bonding a polarizing plate are performed after the other electrode is formed. It is preferred that the other electrode is protected by a protective layer (overcoat layer).

However, when small glass shards (also referred to as cullets) produced during a cutting process of a display cell become attached to a protective layer, because the protective layer exhibits hydrophobicity, there is a problem whereby it is difficult for a cleaning liquid to enter at the interface between the glass shards and the protective layer and can not be easily removed by washing. In addition, there is a danger that the protective layer can become damaged when attempting to physically remove glass shards from the protective layer.

SUMMARY

A display device according to one embodiment of the present invention includes a detection electrode forming a touch panel and arranged on one surface of a display cell, a protective layer covering the detection electrode, and an optical film adhered to the protective layer, wherein a first surface of the protective layer adjacent to the optical film has a smaller water contact angle compared to a second surface of the protective layer adjacent to the display cell.

A display device according to one embodiment of the present invention includes a detection electrode forming a touch panel and arranged on one surface of a display cell, a protective layer covering the detection electrode, and an optical film adhered to the protective layer, wherein a first surface of the protective layer adjacent to the optical film has a larger surface roughness compared to a second surface of the protective layer adjacent to the display cell.

A manufacturing method of a display device according to one embodiment of the present invention includes forming a detection electrode for forming a touch panel on one surface of a display cell, forming a protective layer covering the detection electrode, performing a plasma process on a surface of the protective layer, and cutting the display cell after the plasma process.

DESCRIPTION OF EMBODIMENTS

One issue of the present invention is to easily remove foreign objects attached to a protective layer on the exterior of a display cell in a display device including a touch panel.

Each embodiment of the present invention is explained below while referring to the diagrams. However, the present invention may be performed by various forms which do not depart from the scope of the present invention and the present invention should not be interpreted as being limited to the details described in the embodiments exemplified herein. In addition, while the width and shape etc. of each part in the drawings are sometimes shown schematically compared to the actual forms in order to better clarify the invention, these schematic drawings are merely examples and do not limit an interpretation of the present invention. Furthermore, in the specification and each drawing, the same reference symbols are attached to similar elements which have previously been described and a detailed explanation of these elements may be omitted where appropriate.

First Embodiment

<Structure of a Display Device>

Figure 1:
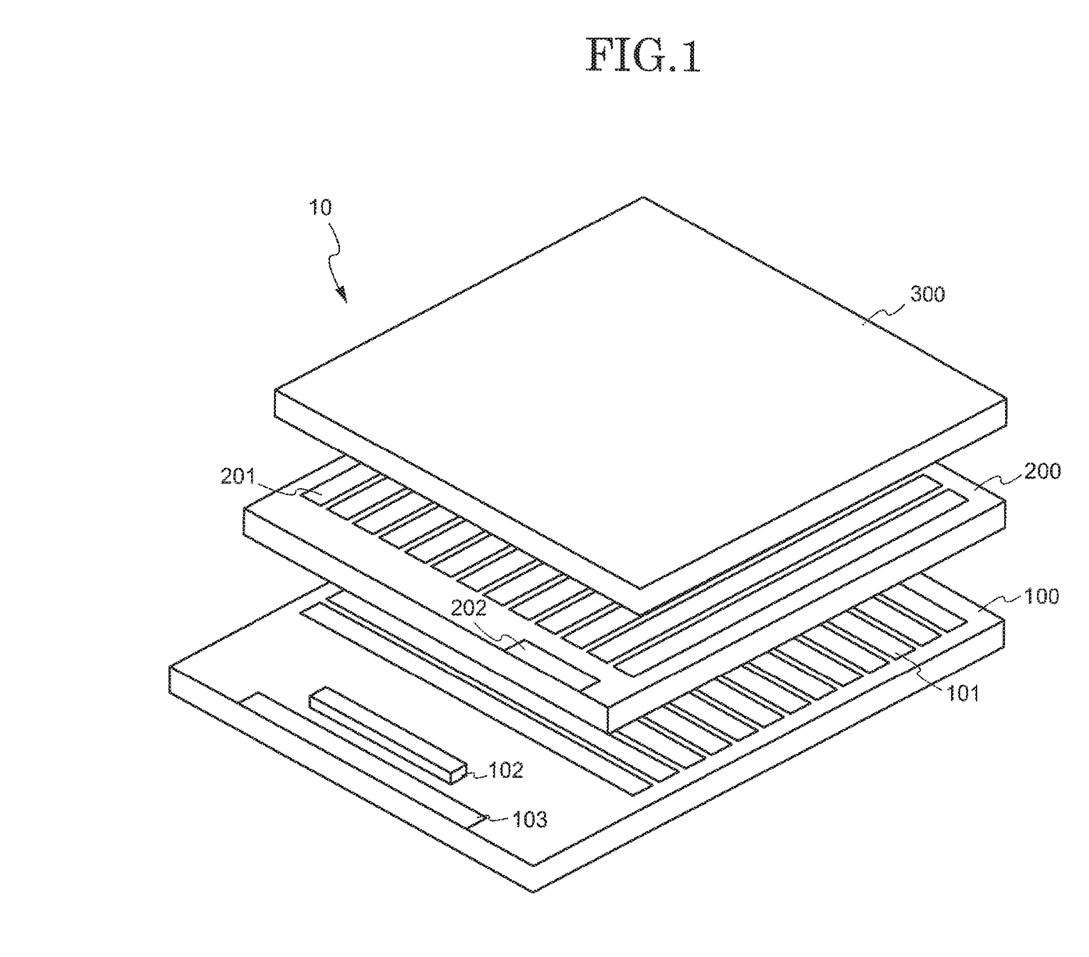
FIG. 1 is a diagram showing a structure of a display device related to one embodiment of the present invention.

A display device 10 including a touch panel according to a first embodiment is explained while referring to the drawings. FIG. 1 is a diagram showing an approximate structure of the display device 10 including a touch panel according to the first embodiment. The display device 10 includes an active matrix substrate 100, an opposing substrate 200 and a cover member 300. A liquid crystal cell is formed by a liquid crystal layer being held between the active matrix substrate 100 and opposing substrate 200. In addition, a plurality of scanning electrodes 101 which form one electrode of a touch panel are arranged in series in the active matrix substrate 100, and a plurality of detection electrode 201 which form the other electrode of the touch panel are arranged in series in the opposing substrate 200. In addition, the touch panel is formed arranged with a sensor part in a matrix shape by forming a plurality of sensor parts at which the plurality of scanning electrodes 101 and plurality of detection electrodes 201 mutually intersect respectively.

Although not shown in the diagram, a display part including a plurality of pixels arranged in a matrix shape is formed by a known semiconductor manufacturing process in the active matrix substrate 100. For example, orientation control of a liquid crystal layer corresponding to each pixel is performed by arranging a thin film transistor as a switching element using a semiconductor thin film in each pixel and controlling the ON/OFF operations of the switching element. In addition, a scanning signal and data signal input to each pixel are transmitted from a drive circuit 102. Furthermore, input/output of a signal to the drive circuit 102 is performed via a terminal part 103. By electrically connecting a known FPC (Flexible Print Circuit) to the terminal part 103, it is possible to transmit signals from the exterior to the drive circuit 102.

Furthermore, although an example using an external IC chip as the drive circuit 102 is shown in the present embodiment, it is possible to form a drive circuit formed using a thin film transistor above the active matrix substrate 100 when forming a display part. In this case, a scanning line drive circuit, a data line drive circuit or either of these may also be formed.

In addition, an operation mode of the liquid crystal cell in the present embodiment may be any known operation mode. For example, a liquid crystal display driven by any of a VA (Vertical Alignment) mode, IPS (In-Plain Switching) mode or FFS (Fringe Field Switching m) mode may be used.

A terminal part is 202 is arranged in the opposing substrate 200 for extracting a detection signal from each of the detection electrodes 201 respectively. By connecting a known FPC (Flexible Print Circuit) to the terminal part 202, it is possible to output a detection signal to the exterior. Furthermore, a color filter or black matrix (light blocking layer) may also be arranged on an opposite surface to the formation surface of the detection electrode 201 in the opposing substrate 200.

Figure 2:
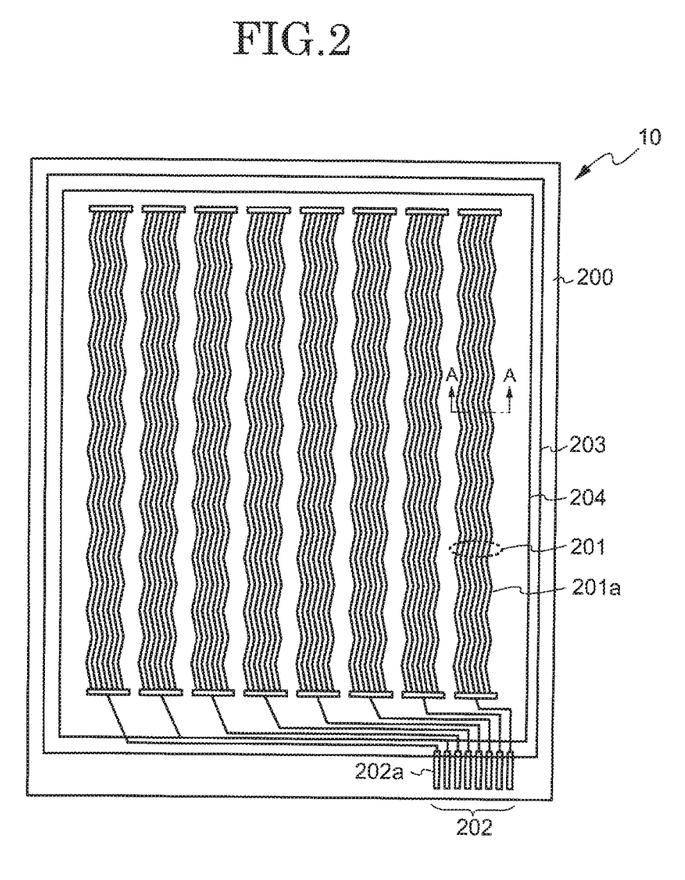
FIG. 2 is a diagram for explaining a structure when a display device related to one embodiment of the present invention is seen from an opposing substrate side.

FIG. 2 is a diagram showing a structure when the display device 10 in the first embodiment is seen from an opposing substrate 200 side. As is shown in FIG. 2, the detection electrode 201 is formed as an aggregate of a plurality of metal electrodes 201a. In addition, a plurality of terminal electrodes 202a electrically connected to each of the plurality of detection electrodes 201 respectively form the terminal part 202. In addition, each detection electrode 201 is covered by a protective layer 203 and a polarizing plate 204 as an optical film. Here, the protective layer 203 protects the detection electrode 201 and the terminal part 202 and is explained in detail herein.

Furthermore, by forming the detection electrode 201 using a plurality of metal electrodes 201a, it is possible to increase the light transparency of a crystal liquid cell compared to forming the detection electrode 201 using a single metal electrode. That is, in the case where the detection electrode 201 is formed using a single metal electrode (rectangular shaped electrode with a wide width), a path through which light passes can only be secured between a detection electrode 201 and an adjacent detection electrode 201. However, in the case of the structure shown in FIG. 2, since it is possible to secure a transparent path for light between adjacent metal electrodes 201a, it is possible to increase light transparency of a liquid crystal cell as a whole.

Figure 3:
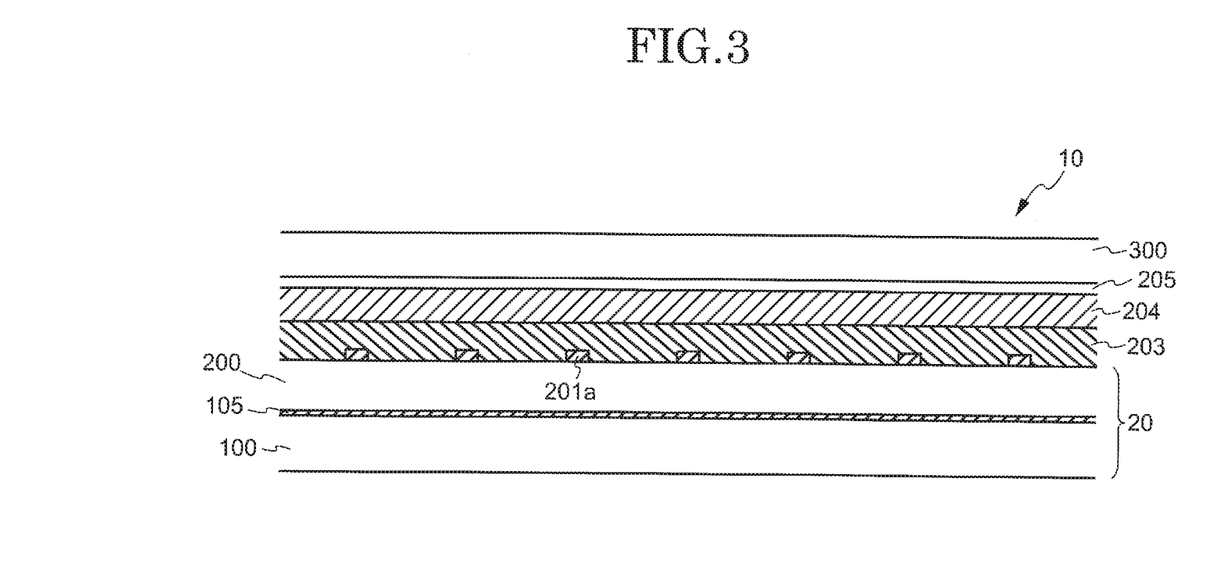
FIG. 3 is a diagram showing a schematic cross-section of a display device related to one embodiment of the present invention.

FIG. 3 is a diagram schematically showing a cross-section of the display device 10 shown in FIG. 2 cut along the broken line shown by A-A. As is shown in FIG. 3, in the display device 10 in the first embodiment, a liquid crystal cell 20 is formed by the active matrix substrate 100, liquid crystal layer 105 and opposing substrate 200. Although the display device of the present embodiment 10 is arranged with a scanning electrode 10 which forms a touch panel above the active matrix substrate 100, this is omitted from FIG. 3 in order to simplify explanation. In addition, a plurality of metal electrodes 201a is arranged on one surface of the liquid crystal cell 200. In the present embodiment, although an electrode having a stacked structure in which an aluminum alloy is sandwiched by a thin film including molybdenum as the metal electrode 201a, the present invention is not limited to this structure and any metal material may be used.

The protective layer 203 is arranged as an overcoat layer above the metal electrode 201a. The polarizing plate 204 is adhered there upon and a cover member 300 is adhered via an adhesive 205 above the polarizing plate 204. In the present embodiment, although glass is used as the material of the cover member 300, it is also possible to use a known material as the material for the polarizing plate 204, adhesive 205 and cover member 300. In addition, in the present embodiment, although an example is h n where the polarizing plate 204 is arranged as an optical film between the opposing substrate 200 and the cover member 300, other optical films such as a phase difference plate may also be arranged.

The protective layer 203 is formed from an insulator. For example, it is possible to use an acrylic resin or polyimide resin as an insulator as the protective layer 203 in the present embodiment. In addition, as a feature of the present embodiment, a plasma process is performed with respect to the surface of the protective layer 203 and a hydrophilic treatment and roughening treatment are intentionally performed. Specifically, by performing a plasma process with respect to the surface of a resin layer after forming the resin layer to be used as the protective layer 203, improvements are made such as reducing a water contact angle of the surface of the resin layer (hydrophilicity) and increasing surface roughness.

Figure 4:
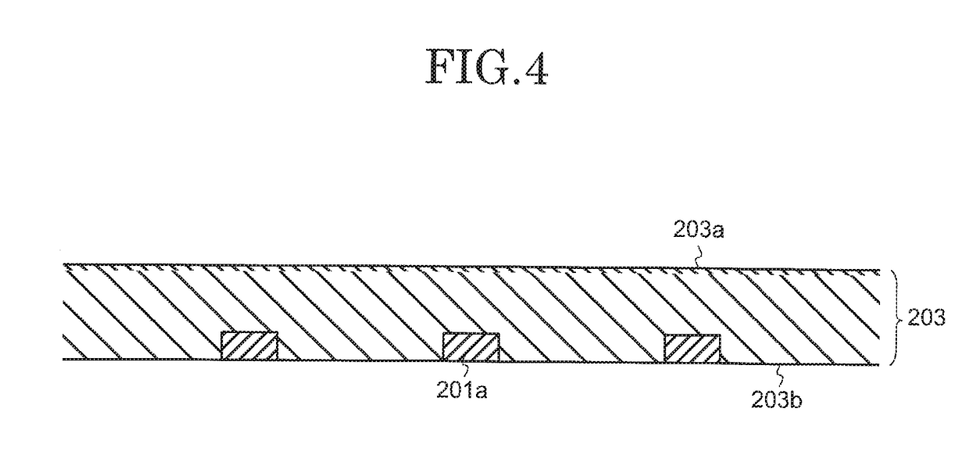
FIG. 4 is a diagram schematically representing a protective layer in one embodiment of the present invention.

FIG. 4 is a schematic diagram focusing on the protective layer 203 in FIG. 3. In the present embodiment, in the protective layer 203, a surface adjacent to an optical film (polarizing plate 204 in the present embodiment) is called a [first surface] and a surface adjacent to one surface of the liquid crystal cell 20 is called a [second surface]. That is, the protective layer 203 includes a first surface 203a adjacent to an optical film and a second surface 203b adjacent to a liquid crystal cell. In addition, as described previously, a hydrophilic treatment and roughening treatment are intentionally performed on the first surface 203a of the protective layer 203.

In the display device 10 of the present embodiment, since a hydrophilic treatment and roughening treatment are performed on the first surface 203a of the protective layer 203, even if glass shards (cullets) which are produced from a liquid crystal cell which is cut in a subsequent process become attached to the first surface 203a of the protective layer 203, it is possible to easily remove the glass shards by ultrasonic cleaning and the like using pure water.

When a plasma process is performed with respect to a surface of a resin layer, the amount of a hydroxyl group increases in the surface of the resin layer and a water contact angle decreases compared to the case where a plasma process is not performed. For example, by performing a plasma process with respect to an acrylic resin layer with a water contact angle of 95°, it is possible to set the water contact angle at the surface of the acrylic resin layer to 40° or less (typically, 5° or more and 20° or less). When using the display device 10 of the present embodiment as an example, it is possible to set the water contact angle of the first surface 203a of the protective layer 203 to half or more of the water contact angle of the second surface 203b on which a plasma process is not performed.

By reducing the water contact angle of the first surface 203a of the protective layer 203, even if foreign objects (cullets) become attached during a subsequent cutting process of a display cell, it is possible to increase cleaning effects by pure water and easily remove foreign objects.

In addition, when a plasma process is performed with respect to the surface of a resin layer, a relief is formed in the surface of the resin layer and surface roughness increases compared to a case where a plasma process is not performed. For example, in the case where a ten point average roughness (Rz) is used as the surface roughness, by performing a plasma process with respect to an acrylic resin layer with a surface roughness of about 3 nm, it is possible to set the roughness of surface of the acrylic layer to 5 nm (typically, 5 nm or more and 20 nm or less). When the display device 10 of the present embodiment is used as an example, it is possible to set the surface roughness of the first surface 203a of the protective layer 203 to twice or more (preferably three times or more) and ten times or less (preferably five times or less) compared to the second surface 203b which has not received a plasma process.

By increasing the roughness of the first surface 203a of the protective layer 203, it becomes more difficult for foreign objects (cullets) to become attached to the surface in a subsequent cutting process of a display cell, it is possible to increase the washing effects using pure water even when foreign objects become attached and it is possible to easily remove foreign objects. Furthermore, since the contact area between the protective layer 203 and foreign objects is reduced, the effect of being able to reduce the amount of charge is also exhibited.

Furthermore, although the example above was explained using a comparison between the first surface 203a which is a surface that has received a plasma process and the second surface 203b which is a surface that has not received a plasma process, this is merely an example explaining the difference between the surface of a resin layer that has received a plasma process and a surface of a resin layer that has not received a plasma process. Therefore, comparing a water contact angle in a surface (surface on an optical film side) of a protective layer arranged on the exterior of a liquid crystal cell of a display device and a water contact angle (or surface roughness) in a surface of a resin layer formed using the same material as the protective layer and not having received a plasma process, if it is judged that the water contact angle of the former is small (or surface coarseness is large), then it is clear that a protective layer which has a surface having received a plasma process is used as in the present embodiment.

As explained above, since the display device 10 in the first embodiment has a protective layer 203 as an overcoat layer with a surface receiving a plasma process, a water contact angle in a surface (first surface 202a) of the protective layer 203 is small and surface roughness is large compared to the case where a plasma process is not received. In this way, even if glass shards (cutlets) which are produced from a liquid crystal cell which is cut in a subsequent process become attached to the first surface 203a of the protective layer 203, it is possible to easily remove the glass shards by ultrasonic cleaning and the like using pure water.

<Manufacturing Method of a Display Device>

Next, a manufacturing process of the display device 100 in the present embodiment is explained using FIG. 5A to FIG. 7. FIG. 5A to FIG. 7 are diagrams showing a manufacturing process of the display device 10 in the first embodiment. Furthermore, although one liquid crystal cell is focused on for the convenience of explanation, in an actual manufacturing process a plurality of liquid crystal cells 20 are formed at once using a large glass substrate.

Figure 5A:
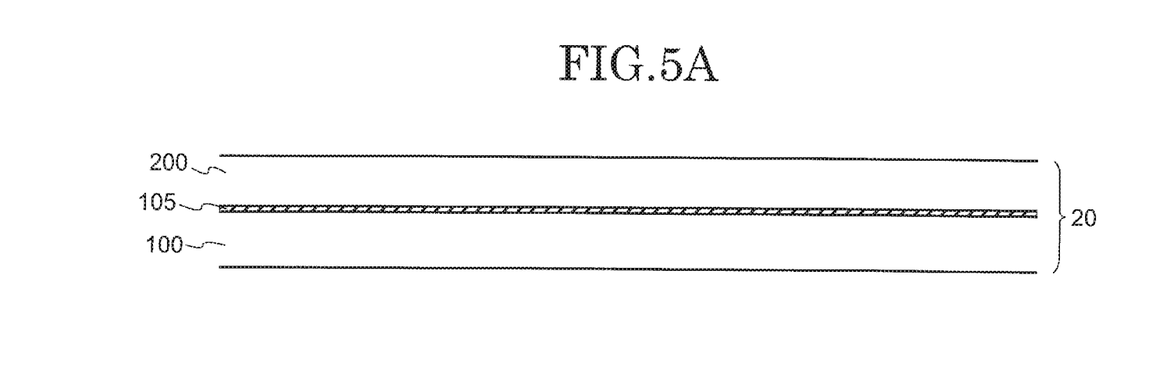
FIG. 5A is a diagram showing a manufacturing process of a display device in a first embodiment of the present invention.

First, the liquid crystal cell 20 is prepared as is shown in FIG. 5A. It is possible to use a known liquid crystal cell manufacturing process when forming the liquid crystal cell 20. In the present embodiment, the liquid crystal cell 20 is completed by forming the active matrix substrate 100 and opposing substrate 200 and sealing a liquid crystal layer 105 using a known sealing material between the substrates.

Figure 5B:
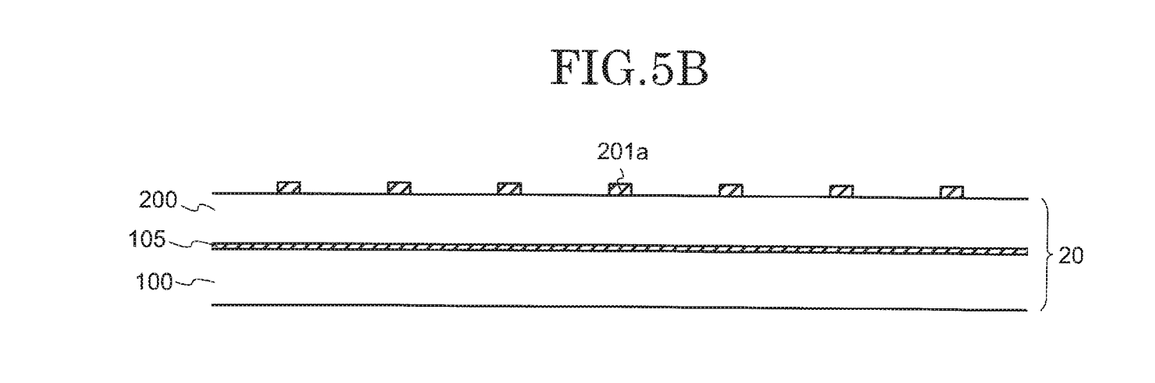
FIG. 5B is a diagram showing a manufacturing process of a display device in a first embodiment of the present invention.

Next, the metal electrode 201a is formed on one surface (surface which serves as a display surface of the display device 10) of the liquid crystal cell 20 as is shown in FIG. 5B. In the present embodiment, a stacked structure metal layer sandwiching an aluminum alloy using a thin film including molybdenum is formed by a sputtering method, and patterning is performed by photolithography to form the metal electrode 201a.

In addition, a reflectance prevention layer may also be arranged in the surface of the metal electrode 201a. For example, it is possible to reduce reflectance in a surface of the metal electrode 201a by forming a three layer stacked structure with different refractive indexes in a surface of the metal electrode 201a, and improve visibility of the display device 10.

Figure 6A:
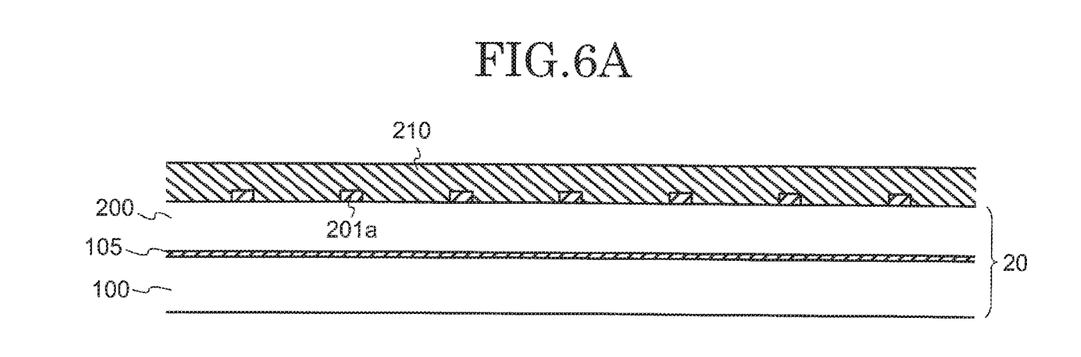
FIG. 6A is a diagram showing a manufacturing process of a display device in a first embodiment of the present invention.

Next, a resin layer 210 is formed so as to cover the metal electrode 201a as is shown in FIG. 6A. In the present embodiment, a layer formed using an acrylic resin is formed as the resin layer 210. Naturally, a polyimide resin may also be used as the resin layer 210.

Figure 6B:
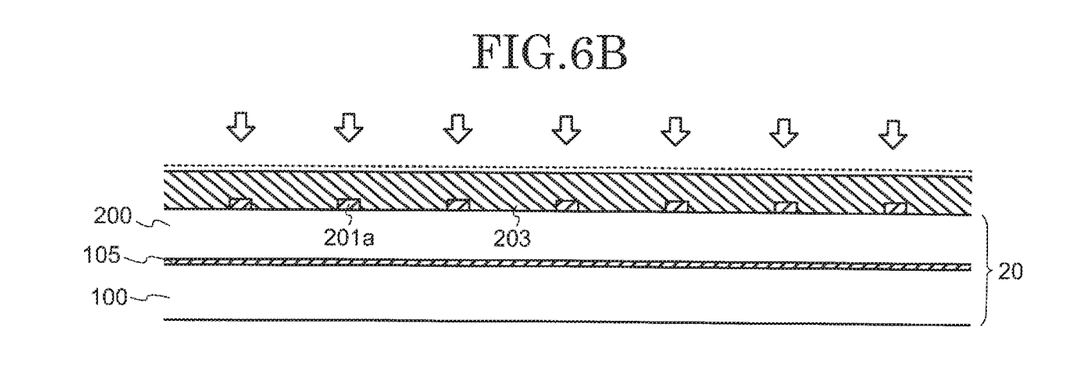
FIG. 6B is a diagram showing a manufacturing process of a display device in a first embodiment of the present invention.
Figure 7:
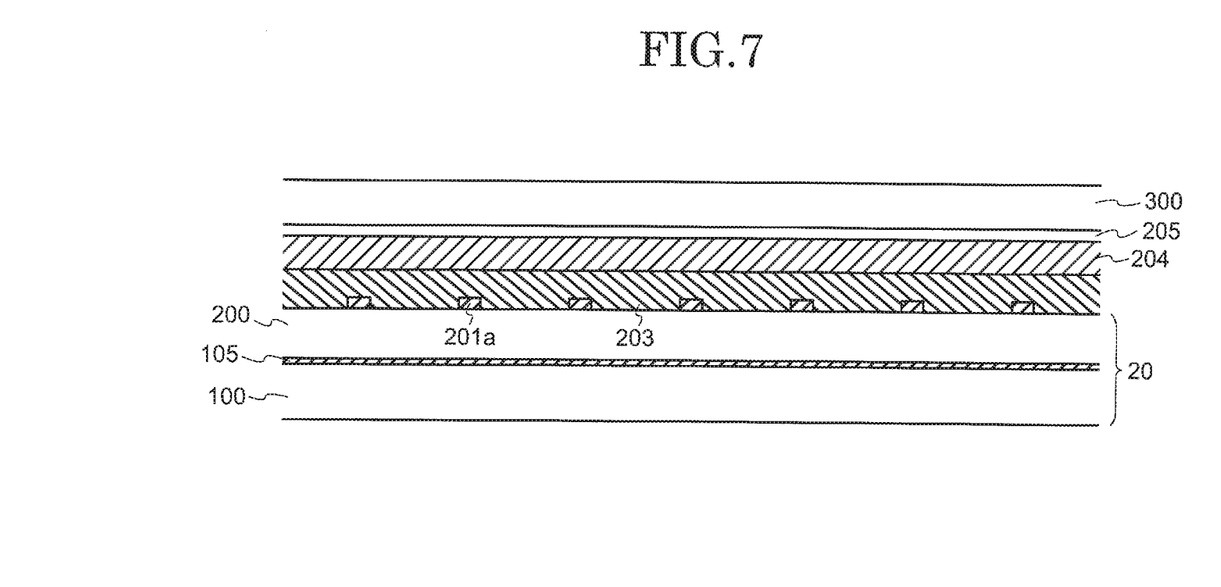
FIG. 7 is a diagram showing a manufacturing process of a display device in a first embodiment of the present invention.

When the resin layer 210 is formed, a plasma process is performed on the surface of the resin layer 210 as is shown in FIG. 6B. The plasma process is performed by generating a plasma between a pair of electrodes places on a process substrate while flowing an inert gas (typically, argon gas or nitrogen gas) under a vacuum or atmospheric pressure. As a result, the vicinity of the first surface 203a of the protective layer 203 obtained after a plasma process has been performed has a higher inert gas atom concentration compared to the vicinity of the second surface 203b of the protective layer 203.

The surface of the resin layer 210 is improved and the protective layer 203 is formed by performing a plasma process on the resin layer 210. In the protective layer 203 shown in FIG. 6B, a surface adjacent to the liquid crystal cell 20 corresponds to the second surface 203b shown in FIG. 4, and a surface having received a plasma process corresponds to the first surface 203a shown in FIG. 4.

Next, a polarizing plate 204 is adhered to the protective layer 203, and a cover glass is further adhered as a cover member 300 via an adhesive 205. In this way, the display device 10 explained using FIG. 3 is completed.

Furthermore, although a display device using a liquid crystal cell as a display cell was exemplified in the present embodiment, a display cell using an organic EL element or light emitting diode as a display cell can also be used.

Modified Example 1

In the first embodiment described above, although an example was shown in which a hydrophilic treatment and roughening treatment are performed on the first surface 203a of the protective layer 203 by performing a plasma process on a surface of a resin layer, the present invention is not limited to this and it is sufficient that at least a hydrophilic treatment be performed on the first surface 203a. That is, if a hydrophilic treatment is performed on the first surface 203a of the protective layer 203 by performing a plasma process on a surface of a resin layer, it is possible to exhibit the same effects as in the first embodiment even if surface roughness hardly changes. That is, the vicinity of the first surface 203a of the protective layer 203 has a higher hydrophilic functional group concentration than the interior of the protective layer.

Modified Example 2

In the first embodiment described above, although an example was shown in which a hydrophilic treatment and roughening treatment are performed on the first surface 203a of the protective layer 203 by performing a plasma process on a surface of a resin layer, a UV (ultra-violet light) process may also be performed instead of or in addition to the plasma process. Since a hydrophilic treatment is performed on the first surface 203a of the protective layer 203 by performing a UV process on a surface of a resin layer, it is possible to increase washing curing of foreign objects to a certain extent even if surface roughness hardly changes.

Second Embodiment

<Structure of a Display Device>

A display device 30 having a touch panel according to a second embodiment is explained while referring to the drawings. Furthermore, the difference between the display device 30 according to the second embodiment and the display device 10 according to the first embodiment described previously is that the display device 30 of the second embodiment uses a negative type photosensitive resin material as a structural material of a protective layer. Therefore, in the present embodiment an explanation is provided focusing on the different points and the same reference symbols are attached to the same parts as in the display device 10 of the first embodiment so that an explanation is sometimes omitted.

Figure 8:
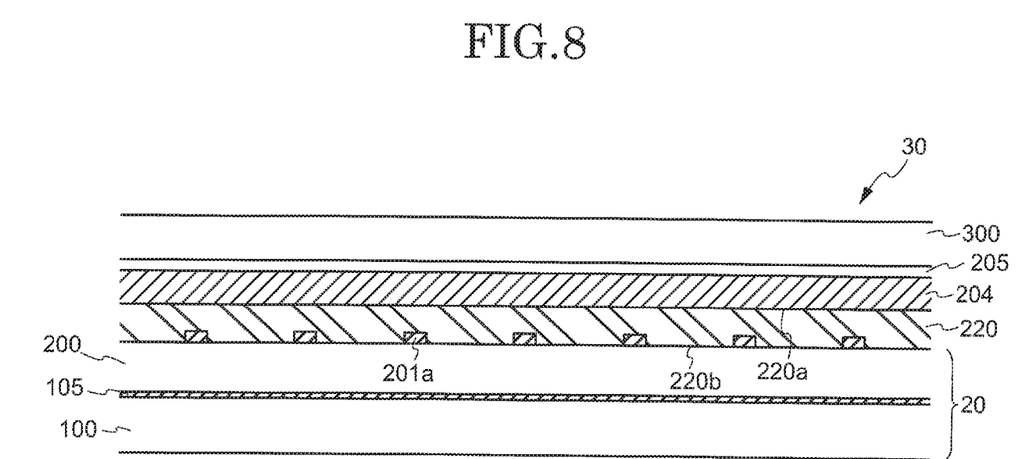
FIG. 8 is a diagram showing a manufacturing process of a display device in a second embodiment of the present invention.

FIG. 8 is a diagram schematically showing a cross-section of a part of the display device 30 of the second embodiment. In the present embodiment, a protective layer 220 formed using a negative type photosensitive resin material is arranged so as to cover the metal electrode 201a. A negative type photosensitive resin material includes properties which can cause a polymerization reaction due to light irradiation such as ultraviolet light and can selectively cure parts which are irradiated with light. Using these properties, parts other than parts which are cured using irradiated light are generally removed using a developing solution and used for the purpose of forming a desired pattern.

With regards to such a negative type photosensitive resin material, a phenomenon is known whereby a polymerization reaction is blocked due to oxygen in parts which contact oxygen in a surface vicinity at the time of a polymerization reaction due to light irradiation and the surface vicinity does not cure. In the present embodiment, using this phenomenon which is usually referred to as a defect, the surface roughness of a first surface 220a (surface adjacent to the polarizing plate 204) of the protective layer 220 is increased compared a second surface 220b. That is, by using a negative type photosensitive material as a structural material of the protective layer 220, it is possible to remove the surface vicinity of a negative type photosensitive material selectively by using the developing solution. In this way, a relief is intentionally formed in the surface of the protective layer 220.

For example, in the case where a ten point average roughness (Rz) is used as surface roughness, it is possible to set the surface roughness of a photosensitive resin layer to 10 nm or more (typically, 10 nm or more and 30 nm or less) by using a negative type photosensitive resin. When the display device 30 of the present invention is used as an example, surface roughness of the first surface 220a of the protective layer 220 is larger compared to the second surface 220b and can be set to twice or more (preferably three times or more) of the second surface 220b.

Figure 9A:
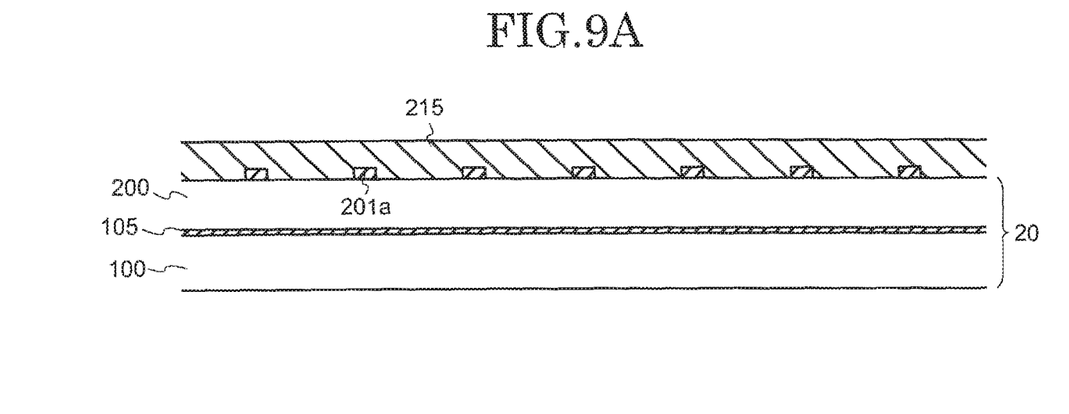
FIG. 9A is a diagram showing a manufacturing process of a display device in a second embodiment of the present invention.
Figure 9B:
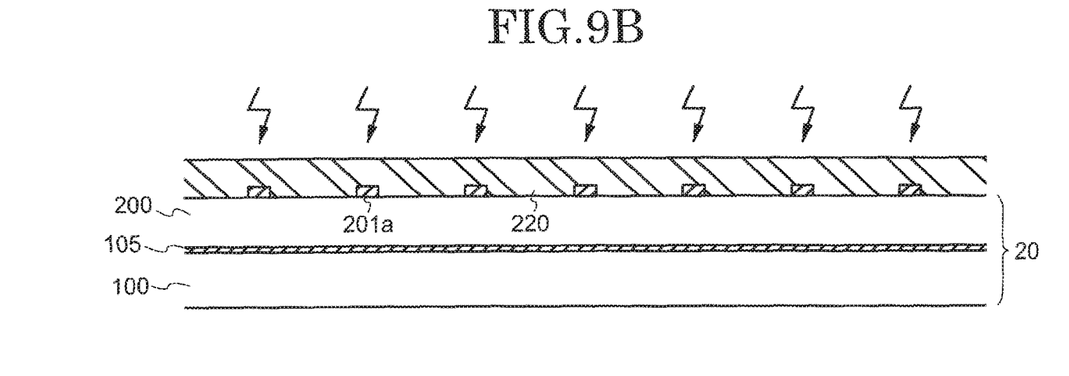
FIG. 9B is a diagram showing a manufacturing process of a display device in a second embodiment of the present invention.

Here, FIG. 9A and FIG. 9B are diagrams showing a manufacturing process of the display device 30 of the present embodiment. Specifically, a part related to the formation of the protective layer 220 is shown. First, a negative type photosensitive resin material 215 is coated so as to cover the metal electrode 201a using an inkjet method, printing method or spin coating method as is shown in FIG. 9A. For example, it is possible to use an acrylic group monomer as the negative type photosensitive resin material.

When the negative type photosensitive resin material 215 is coated, uncured parts are removed by a developing solution after irradiating ultraviolet light on the entire surface and curing the negative type photosensitive resin material. The protective layer 220 is formed so as to cover the metal electrode 201a via this type of process. At this time, as described above the surface roughness of the surface of the protective layer 220 is 10 nm or more (typically 10 nm or more and 30 nm or less).

As explained above, since the display device 30 in the second embodiment uses a protective layer 220 formed using a negative type photosensitive resin material, it is possible to increase surface roughness in a surface (first surface 203a) of the protective layer 220. In this way, even if glass shards (cutlets) which are produced from a display cell which is cut in a subsequent process become attached to the first surface 220a of the protective layer 220, it is possible to easily remove the glass shards by ultrasonic cleaning and the like using pure water.

Appropriate additions, deletions or design changes to structural elements or additions, omissions or changes in conditions of processes by a person ordinarily skilled in the art based on the display device explained as an embodiment of the present invention are included within the scope of the present invention as long as they don't depart from the scope of the present invention.

In addition, it should be understood that even other effects different to those effects brought about by the embodiments described above are obvious from the descriptions in the present specification or those that that could be easily foreseen by a person ordinarily skilled in the art are also to be understood as being brought about by the present invention.

What is claimed is:

1. A display device comprising:
   a detection electrode forming a touch panel and arranged on a first surface of a display cell;
   a protective layer covering and being in contact with the detection electrode and the first surface of the display cell; and
   an optical film directly adhered on a first surface of the protective layer;
   wherein the first surface of the protective layer has a larger surface roughness compared to a second surface of the protective layer opposing to the first surface of the protective layer.

2. The display device according to claim 1, wherein the first surface of the protective layer has twice or more and ten times or less surface roughness compared to the second surface of the protective layer.

3. The display device according to claim 1, wherein the surface roughness of the first surface of the protective layer is 5 nm or more and 20 nm or less.

4. The display device according to claim 1, wherein the optical film is a polarizing plate.

5. The display device according to claim 1, wherein the display cell is a liquid crystal display panel.

* * * * *